(12) United States Patent
Mulvey et al.

(10) Patent No.: US 8,963,357 B2
(45) Date of Patent: Feb. 24, 2015

(54) APPARATUS FOR GENERATING ELECTRICITY FROM A TIDAL WATER FLOW

(75) Inventors: Patrick James Mulvey, Edinburgh (GB); Timothy Patrick Crowley, Edinburgh (GB)

(73) Assignee: Firth Tidal Energy Limited, Edinburgh (GB)

(*) Notice: Subject to any disclaimer, the term of this patent is extended or adjusted under 35 U.S.C. 154(b) by 202 days.

(21) Appl. No.: 13/138,586

(22) PCT Filed: Mar. 11, 2010

(86) PCT No.: PCT/GB2010/000440
§ 371 (c)(1),
(2), (4) Date: Sep. 8, 2011

(87) PCT Pub. No.: WO2010/103280
PCT Pub. Date: Sep. 16, 2010

(65) Prior Publication Data
US 2011/0316281 A1 Dec. 29, 2011

(30) Foreign Application Priority Data
Mar. 13, 2009 (GB) .................................. 0904408.2

(51) Int. Cl.
*F03B 13/12* (2006.01)
*F03B 13/26* (2006.01)

(52) U.S. Cl.
CPC ......... *F03B 13/264* (2013.01); *F05B 2240/133* (2013.01); *F05B 2240/40* (2013.01); *Y02E 10/28* (2013.01)
USPC ....................................................... 290/53

(58) Field of Classification Search
CPC ....... F03B 13/10; F03B 13/264; Y02E 10/38; Y02E 10/28
USPC ....................... 290/42, 43, 53, 54; 405/75–78
See application file for complete search history.

(56) References Cited

U.S. PATENT DOCUMENTS

| 4,468,153 | A | * | 8/1984 | Gutierrez Atencio | .......... | 405/78 |
| 4,804,855 | A | * | 2/1989 | Obermeyer | ..................... | 290/54 |
| 5,825,094 | A | * | 10/1998 | Hess | .............................. | 290/54 |

(Continued)

FOREIGN PATENT DOCUMENTS

| CA | 2 615 808 | 3/2003 |
| FR | 2 867 147 | 9/2005 |

(Continued)

*Primary Examiner* — Tulsidas C Patel
*Assistant Examiner* — Viet Nguyen
(74) *Attorney, Agent, or Firm* — Iandiorio Teska & Coleman, LLP

(57) ABSTRACT

Apparatus (2) for generating electricity from a tidal water flow, which apparatus (2) comprises a plurality of units (4) which generate electricity, and a base (6) for securing the units (4) to a water bed (8), the apparatus (2) being such that: (i) the units (4) each comprise a housing (10) and a turbine generator (12) which is positioned in the housing (10) and which generates the electricity; (ii) the housing (10) has openings (14, 16) for allowing the tidal water to flow through the housing (10) and rotate the turbine generator (12) in order to cause the turbine generator (12) to generate the electricity; (iii) the housing (10) has at least six sides (18) and is symmetrical in end view; (iv) the units (4) contact each other along at least two adjacent sides (18), whereby the units (4) securely connect to each other and provide support for each other; (v) the base has an upper surface (20) with at least one recess (22) which receives a lower part of at least one of the units (4); and (vi) the recess (22) is of a complementary shape to the shape of the lower part of the unit (4) that is located in the recess (22), whereby a plurality of sides of the unit (4) engage adjacent sides of the recess (24), and whereby the unit (4) in the recess (22) securely connects to the base (6).

11 Claims, 4 Drawing Sheets

(56) References Cited

U.S. PATENT DOCUMENTS

| | | | |
|---|---|---|---|
| 7,595,565 B2 * | 9/2009 | Chen et al. | 290/55 |
| 7,804,186 B2 * | 9/2010 | Freda | 290/55 |
| 2010/0026003 A1 * | 2/2010 | Filardo | 290/54 |

FOREIGN PATENT DOCUMENTS

| | | |
|---|---|---|
| GB | 2 001 396 | 1/1979 |
| WO | WO 89 00646 | 1/1989 |
| WO | WO 2005/119053 A1 | 12/2005 |

* cited by examiner

APPARATUS FOR GENERATING ELECTRICITY FROM A TIDAL WATER FLOW

This invention relates to apparatus for generating electricity and, more especially, this invention relates to apparatus for generating electricity from a tidal water flow.

Apparatus for generating electricity from a tidal water flow is known. The known apparatus may comprise one or more turbine generators which are rotated by the tidal water flow and which thereby generate the electricity. The known apparatus is often such that it is not sufficiently strong to withstand the forces exerted on it by the tidal water. The known apparatus is also often such that it cannot easily be installed in a short space of time, thereby leading to installation problems if the apparatus is to be installed in deep water where the tidal flow reduces the depth of water to a manageable extent only for a short period of time.

It is an aim of the present invention to reduce the above mentioned problems.

Accordingly, the present invention provides apparatus for generating electricity from a tidal water flow, which apparatus comprises a plurality of units which generate electricity, and a base for securing the units to a water bed, the apparatus being such that;
(i) the units each comprise a housing and a turbine generator which is positioned in the housing and which generates the electricity;
(ii) the housing has openings for allowing the tidal water to flow through the housing and rotate the turbine generator in order to cause the turbine generator to generate the electric*
(iii) the housing has at least six sides defining each one of the openings and is symmetrical in end view;
(iv) the units contact each other along at least two adjacent sides, whereby the units securely connect to each other and provide support for each other,
(v) the base has an upper surface with at least one recess which receives a lower part of at least one of the units;
(vi) the recess has a bottom and two sides which are positioned one at each end of the bottom and which extend upwardly from the bottom and away from each other;
(vii) the recess is of a complementary shape to the shape of the lower part of the unit that is located in the recess, whereby a plurality of sides of the unit engage adjacent sides of the recess;
(viii) the recess allows the units to contact each other alone the said at least two adjacent sides of the units;
(ix) the recess is of a length which supports substantially the entire length of the lower part, of the unit that is located in the recess, whereby the unit In the recess securely connects to the base; and
(x) the base does not surround all the units, whereby the units are stackable and un-stackable in a direction which is perpendicular to the base.

With the apparatus of the present invention, the units are able to securely connect to each other and provide support for each other. The units are also able to be securely connected to the base via the or each unit that is located in the base. Thus the apparatus is able to be stably constructed to withstand the forces of the tidal water. Also, the units can relatively easily be connected to each other so that the apparatus is able to be installed in what is often a short window of time during ebb and flow of the tidal water and when the tidal water is at its lowest height from the water bed, thereby facilitating its installation. Still further, the use of a plurality of the units each with its own turbine generator means that in the event of a turbine generator becoming defective, for example due to damage from a floating object, the apparatus may still be able to operate and generate electricity, with the damaged unit being able to be repaired and/or replaced, whilst the remaining units continue to generate the electricity. Even if a damaged unit has to be replaced, it is easier to remove and replace one relatively small unit rather than the entire apparatus as would occur with many known types of apparatus for generating electricity.

The apparatus of the present invention may be installed in any suitable and appropriate tidal water flow. The apparatus will usually be installed in a sea so that the water bed will then be a sea bed. If desired however, the apparatus may be installed in a river, in which case the water bed will be a river bed.

Preferably, the housing has six of the sides so that the housing is hexagonal in end view. The housing may have more of the sides if desired so that, for example, the housing may have eight of the sides and be octagonal in end view. The sides will usually form a shape which is symmetrical in end view, whereby the units are able to be connected together to form a honeycomb structure. The honeycomb structure has the advantage of being both strong and light. The strength is advantageous for resisting the tidal water flow forces, whilst the lack of weight is advantageous for installation purposes.

Preferably, the openings form Dart of a venturi for directing the tidal water at increased speed to the turbine generator.

The apparatus may be one in which there are two of the openings, arranged in line with each other and one on either side of the turbine generator.

The turbine generator is thus able to be rotated both on ebb and flow of the tidal water, with the venturi always being in use to direct the tidal water at the increased speed to the turbine generator, and the increase in speed being an increase over that which would be present without the use of the venturi.

Preferably, the apparatus is one in which the base has a lower surface which is of the same shape as the surface of the water bed on which the base rests. The water bed will very often not be completely flat and contouring the lower surface of the base to be the same shape as the surface of the water bed facilitates secure keying of the base to the water bed. The base may be secured to the water bed by concrete piling or any other suitable and appropriate means.

The apparatus may include locking means for locking the units together.

Preferably, the locking means comprises rods which extend through locking apertures in the housings of the units. Other types of locking means may be employed.

If desired, the locking means may also lock the unit or units that are in the recess or recesses to the base.

Alternatively, or in addition, the apparatus may include securing means for securing the unit or units that are in recess or recesses to the base. The securing means may be bolts or any other suitable and appropriate desired securing means.

Preferably, the turbine generators are vertically mounted in their housings. The vertical mounting of the turbine generators ensures that they are not put under too great a load. If desired, the turbine generators may alternatively be horizontally mounted in their housings.

The apparatus of the present invention may be made from any suitable and appropriate materials. Thus, for example the housing may be made of stainless steel or glass fibre reinforced plastics materials. Other materials that will not prematurely rust and which provide the required strength may be employed. The base may be made of concrete or it may be made of a metal such for example as steel.

Embodiments of the invention will now be described solely by way of example and with reference to the accompanying drawings in which.

Figure 1:
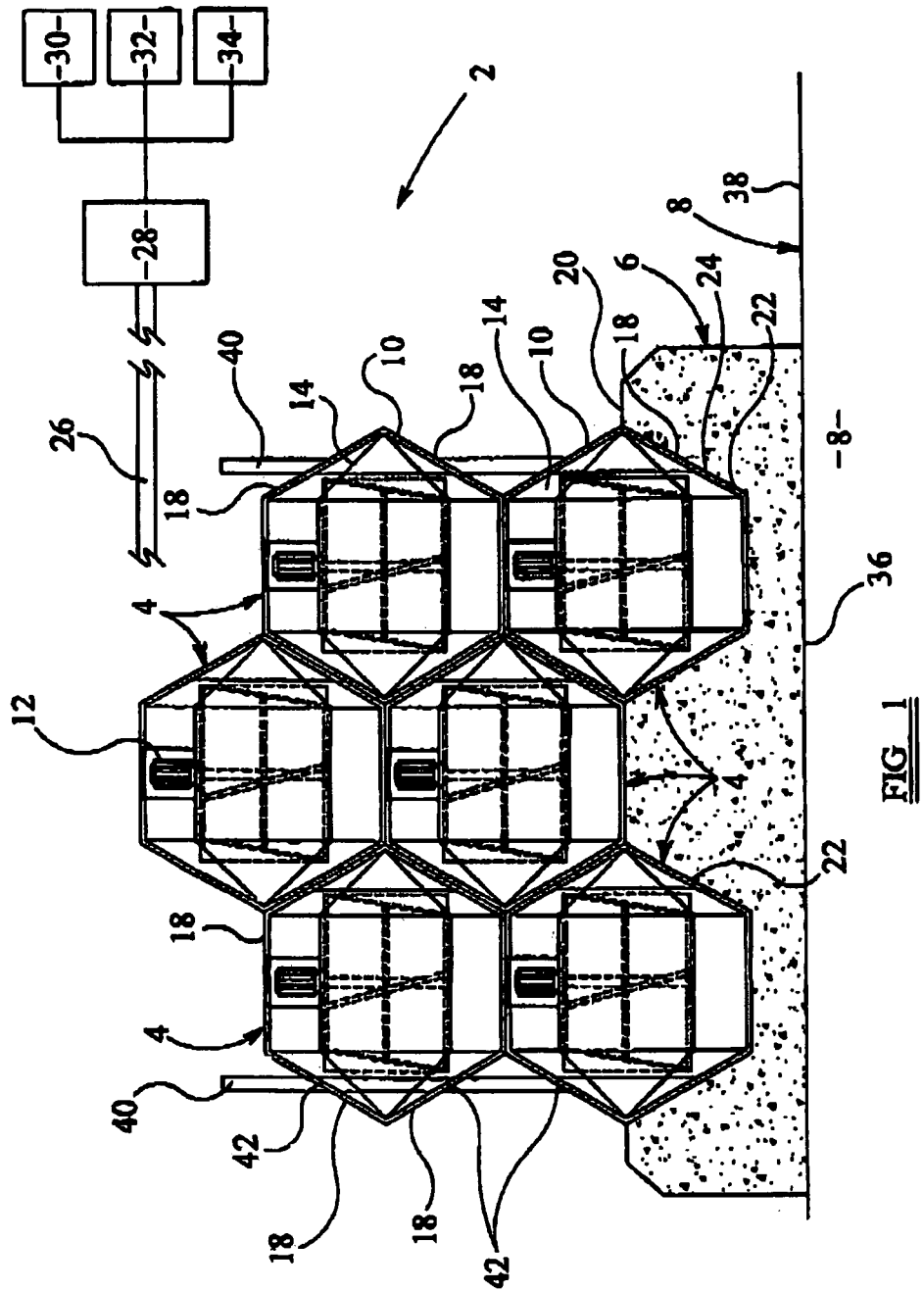
FIG. 1 is an end view of first apparatus of the present invention.

Referring to FIGS. 1-5, there is shown apparatus 2 for generating electricity from a tidal water flow. The apparatus 2 comprises a plurality of units 4 which generate electricity, and a base 6 for securing the units 4 to a water bed 8.

The apparatus 2 is such that the units 4 each comprise a housing 10 and a turbine generator 12. Each turbine generator 12 is positioned in its housing 10, and each turbine generator 12 generates the electricity.

The housing 10 has openings 14, 16 for allowing the tidal water to flow through the housing 10 and rotate the turbine generator 12 in order to cause the turbine generator 12 to generate the electricity. As best appreciated from FIG. 2, the openings 14, 16 are at each end of each unit 4.

As best appreciated, from FIG. 1, the housing 10 has six sides 18 defining each one of the openings 14, 16. Thus the housing 10 is symmetrical in end view.

The units 4 contact each other along at least two adjacent sides 18, whereby the units 4 securely connect to each other and provide support for each other.

As shown in FIG. 1, the base 6 has an upper surface 20 which has two recesses 22. Each recess 22 receives a lower part of one of the units 10 as can be appreciated from FIG. 1. Each recess 22 is of a complementary shape to the shape of the lower part of the unit 4 that is located in the recess 22. By this means, a plurality of sides 18 of the unit 4 engage adjacent sides 24 of the recess 22. By this means the unit 4 in the recess 22 securely connects to the base 6. With the units 4 in the recesses 22 securely connected to the base 6, and with the other units 4 securely connected to these two units 4, the entire apparatus 2 is securely mounted on the base 6. In addition, due to the contacting sides of the unit 6, the unit 6 are stably connected together and the entire apparatus 2 is able to withstand the considerable forces from the tidal water flow. In addition, due to the housings 10, the units 4 connect together to form a honeycomb structure as shown in FIG. 1. This honeycomb structure not only provides the strength for reducing the forces from the tidal water flow, but it also enables the units 4 and therefore the apparatus 2 to be light in construction. Still further, because the apparatus 2 comprises a plurality of the units 4, if one unit 4 should become defective, it is often possible to repair or replace that unit 4 whilst the remainder of the units 4 in the apparatus 2 continue to generate electricity.

As shown schematically in FIG. 1, the units 4 are connected to a common bus bar 26 which directs the generated electricity to an electricity distribution station 28 from where the electricity is able to be distributed as required, for example to towns or cities 30, 32, 34.

Figure 2:
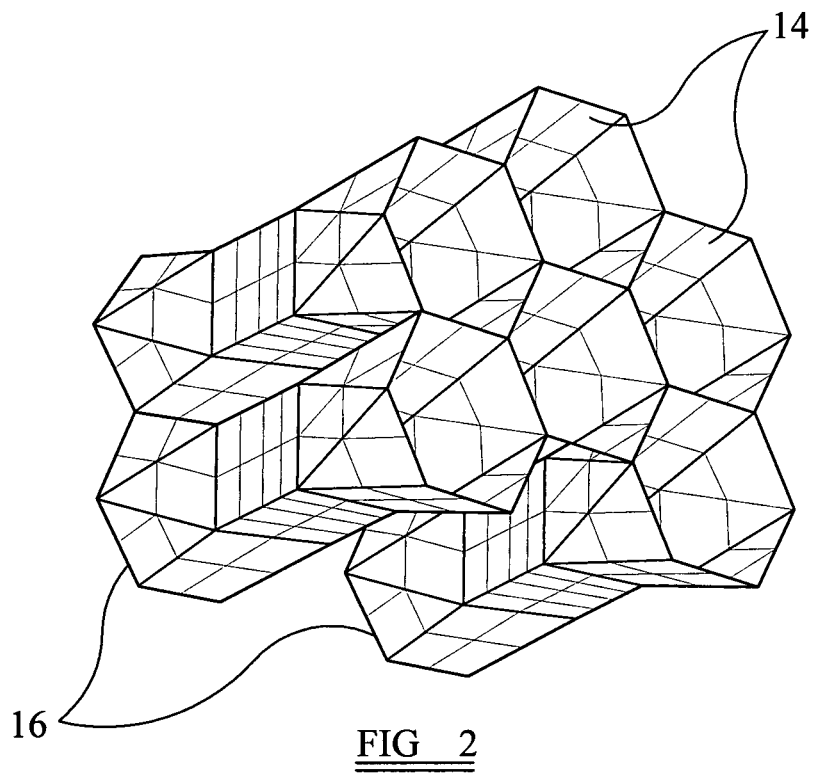
FIG. 2 is a perspective view of the main part of the apparatus shown in FIG. 1.
Figure 3:
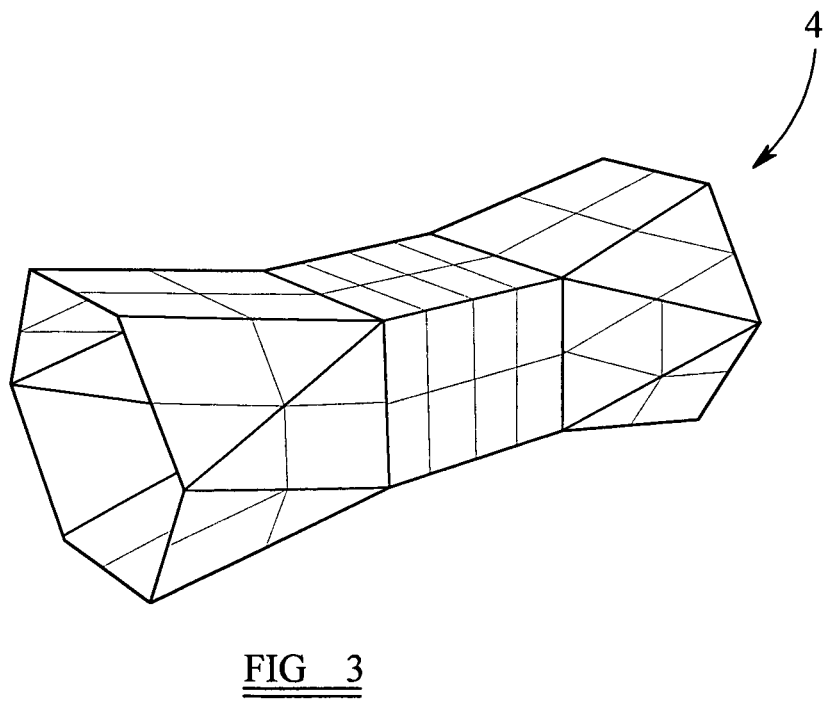
FIG. 3 is a perspective view of one unit forming part of the apparatus shown in FIGS. 1 and 2.
Figure 4:
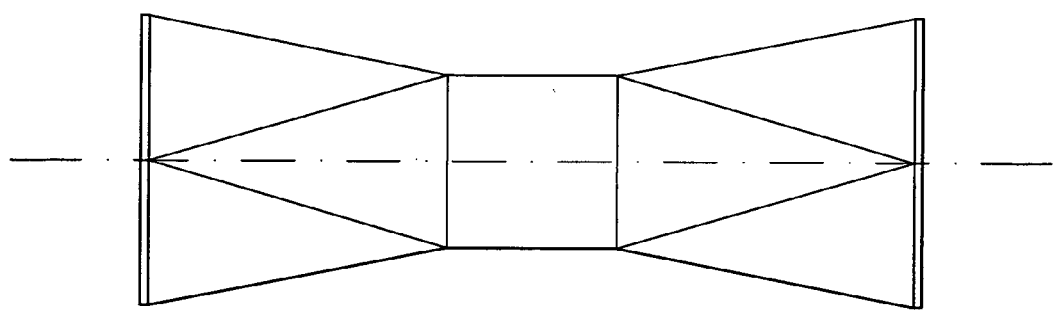
FIG. 4 is a side view of the unit shown in FIG. 3.
Figure 5:
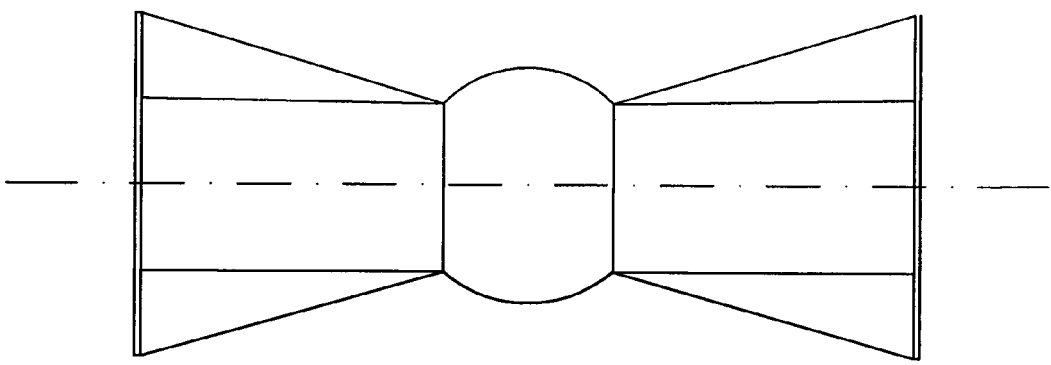
FIG. 5 is a top view of the unit shown in FIG. 3.

As best appreciated from FIGS. 2 and 3, the openings 14, 16 form part of a venturi for directing the tidal water at increased speed to the turbine generator 12. Each unit 4 has two of the openings 14, 16. These openings 14, 16 are arranged in line with each other and they are present one on either side of the turbine generator. Each unit 4 is thus able to receive tidal water at flow and ebb, and direct the tidal water to the turbine generator 12 so that the turbine generator 12 is able to substantially continuously generate electricity.

The base 6 has a lower surface 36 which is of the same shape as the surface 38 of the water bed 8 on which the base 6 rests. For simplicity of illustration, the surface 38 has been shown flat in FIG. 1 but this will often not be the case. Often the surface 38 will be an undulating surface and if the lower surface 36 is of a complementary shape, then the two surfaces 36, 38 key well together and this facilitates the secure location of the base 6 and therefore the apparatus 2 to the water bed 8. The base 6 may be secured to the water bed 8 by concrete piling (not shown).

The apparatus 2 includes locking means in the form of rods 40. The rods 40 extend through locking apertures 42 in the housings 10 of the units 4. If desired, the rods 40 may also extend into the base 6 and thus lock the lowermost units 4 to the base 6. Alternatively or in addition, the lowermost unit 6 may be secured to the base 6 by securing means such for example as bolts.

As shown in FIG. 1, the turbine generators 12 are vertically mounted in their housings 10. The vertical mounting of the turbine generators 12 ensures that they are not put under too great a load by the apparatus 2.

The units 4 may be made of steel or glass fibre reinforced plastics. The base 6 may be made of concrete or a metal. Other materials may be employed for the units 4 and the base 6.

Figure 6:
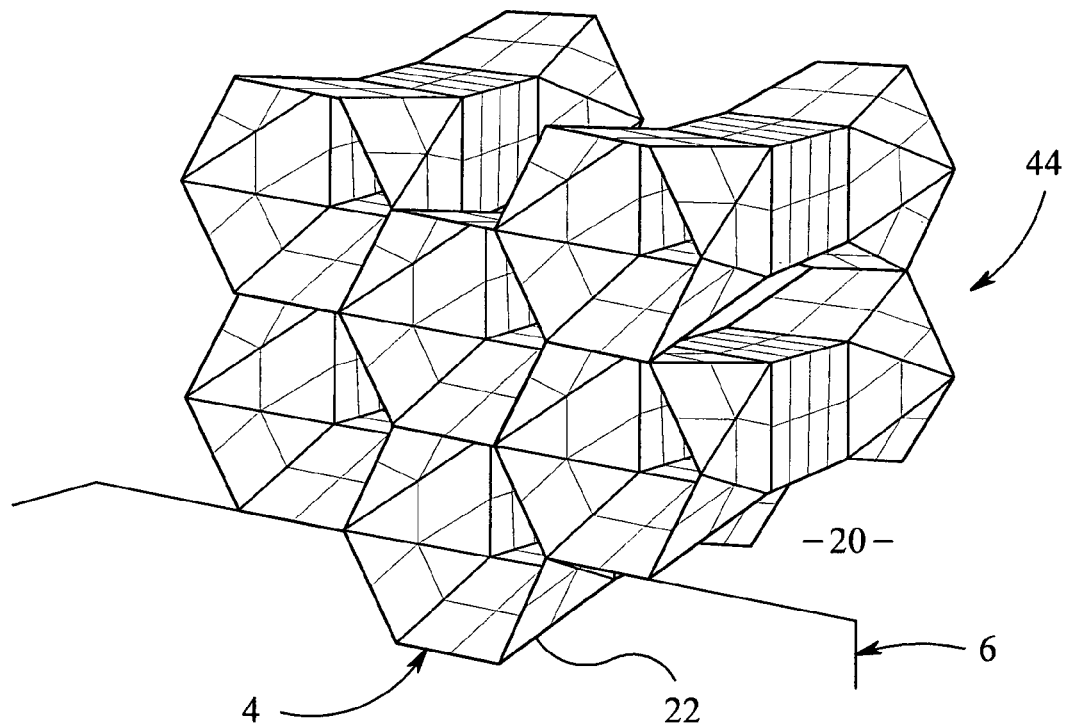
FIG. 6 is a perspective view of the main part of the apparatus as shown in FIG. 1 but turned through 180° in order to show a different way of installing the units to the base and thereby form second apparatus of the invention.

Referring now to FIG. 6, the structure formed of the units 4 has been turned through 180° to illustrate part of second apparatus 44 of the present invention in which only the lowermost single unit 4 locates in a single recess 22 in the upper surface 20 of the base 6.

Figure 7:
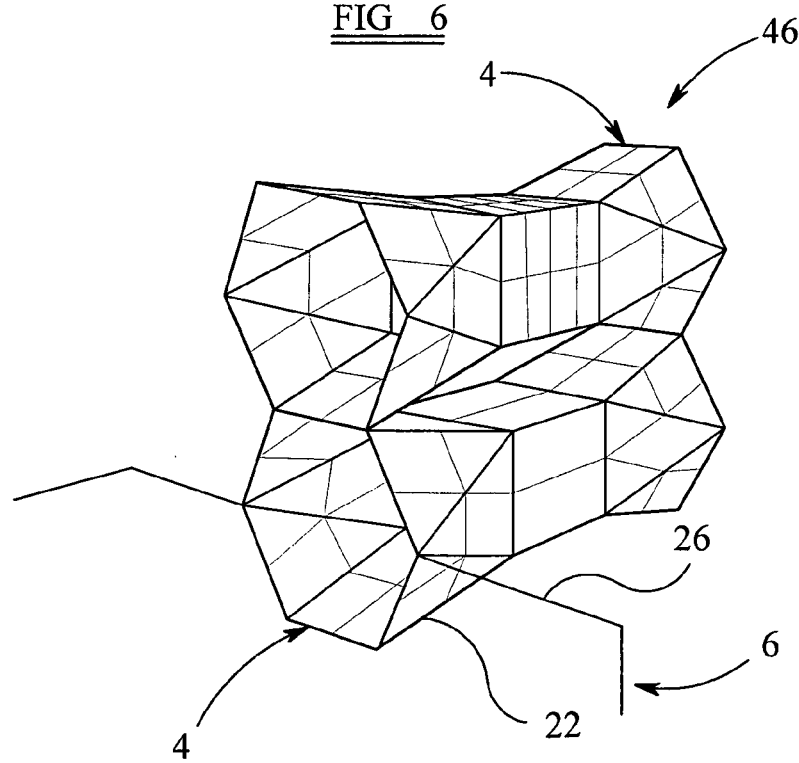
FIG. 7 is a perspective view of a third apparatus showing another construction of units for location to a base.

FIG. 7 shows part of third apparatus 46 in which there are only two of the units 4 with the lowermost unit 4 being in a recess 22 in the upper surface 20 of the base 6, and with the other unit 4 being mounted on top of the lowermost unit 4.

It is to be appreciated that the embodiments of the invention described above with reference to the accompanying drawings have been given by way of example only and that modifications may be effected. Thus, for example, the apparatus of the present invention may be constructed to be of shapes other than shown by the apparatus 2, 44 or 46. Also, for example, the turbine generators 12 may be horizontally mounted rather than being vertically mounted. The housings 10 may be octagonal or of other shape rather than being hexagonal in end view. The apparatus of the present invention may be installed in an ocean or river where there is the required tidal water flow. Individual components shown in the drawings are not limited to use in their drawings and they may be used in other drawings and in all aspects of the invention.

The invention claimed is:

1. Apparatus for generating electricity from a tidal water flow, which apparatus comprises a plurality of units which generate electricity, and a base for securing the units to a water bed, the apparatus being such that:
   (i) the units each comprise a housing and a turbine generator which is positioned in the housing and which generates the electricity;
   (ii) the housing has openings for allowing the tidal water to flow through the housing and rotate the turbine generator in order to cause the turbine generator to generate the electricity;

(iii) the housing has at least six sides defining each one of the openings and is symmetrical in end view;
(iv) the units contact each other along at least two adjacent sides, whereby the units securely connect to each other and provide support for each other;
(v) the base has an upper surface with at least one recess which receives a lower part of at least one of the units;
(vi) the recess has a bottom and two sides which are positioned one at end of the bottom and which extend upwardly from the bottom and away from each other;
(vii) the recess is of a complementary shape to the shape of the lower part of the unit that is located in the recess, whereby a plurality of sides of the unit engage adjacent sides of the recess;
(viii) the recess allows the units to contact each other alone the said at least two adjacent sides of the units;
(ix) the recess is of a length which supports substantially the entire length of the lower part of the unit that is located in the recess, whereby the unit in the recess securely connects to the base; and
(x) the base does not surround all the units, whereby the units are stackable and un-stackable in a direction which is perpendicular to the base.

2. Apparatus according to claim 1 in which the housing has six of the sides so that the housing is hexagonal in end view.

3. Apparatus according to claim 1 in which the openings form part of a venturi for directing the tidal water at increased speed to the turbine generator.

4. Apparatus according to claim 3 in which there are two of the openings, arranged in line with each other and one on either side of the turbine generator.

5. Apparatus according to claim 1 in which the base has a lower surface which is of the same shape as the surface of the water bed on which the base rests.

6. Apparatus according to claim 1 and including locking means for locking the units together.

7. Apparatus according to claim 6 in which the locking means comprise rods which extend through locking apertures in the housings of the units.

8. Apparatus according to claim 6 in which the locking means also locks the unit or units that are in the recess or recesses to the base.

9. Apparatus according to claim 1 and including securing means for securing the unit or units that are in the recess to the base.

10. Apparatus according to claim 1 in which the turbine generators are vertically mounted in their housings.

11. Apparatus according to claim 1 in which the turbine generators are horizontally mounted in their housings.

* * * * *